(12) United States Patent
Pettersson

(10) Patent No.: US 10,107,619 B2
(45) Date of Patent: Oct. 23, 2018

(54) ARTICULATED ARM COORDINATE MEASURING MACHINE

(71) Applicant: HEXAGON TECHNOLOGY CENTER GMBH, Heerbrugg (CH)

(72) Inventor: Bo Pettersson, London (GB)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 652 days.

(21) Appl. No.: 14/641,363

(22) Filed: Mar. 7, 2015

(65) Prior Publication Data

US 2015/0253125 A1    Sep. 10, 2015

(30) Foreign Application Priority Data

Mar. 7, 2014   (EP) .................................... 14158401

(51) Int. Cl.
| | |
|---|---|
| *G01B 5/008* | (2006.01) |
| *G01B 11/00* | (2006.01) |
| *G06F 3/0484* | (2013.01) |
| *G06F 3/0488* | (2013.01) |
| *G06T 11/60* | (2006.01) |

(Continued)

(52) U.S. Cl.
CPC ............ *G01B 11/007* (2013.01); *G01B 5/008* (2013.01); *G01B 21/047* (2013.01); *G06F 3/0484* (2013.01); *G06F 3/0488* (2013.01); *G06T 11/60* (2013.01); *G06T 19/006* (2013.01); *G09G 5/373* (2013.01); *G09G 5/377* (2013.01); *G09G 2340/125* (2013.01); *G09G 2354/00* (2013.01); *G09G 2380/00* (2013.01)

(58) Field of Classification Search
CPC ................................. G01B 5/008; G01B 7/008

USPC ........................................................ 33/503
See application file for complete search history.

(56) References Cited

U.S. PATENT DOCUMENTS

| | | | |
|---|---|---|---|
| 5,402,582 A | 4/1995 | Raab | |
| 5,978,748 A | 11/1999 | Raab | |

(Continued)

FOREIGN PATENT DOCUMENTS

| | | |
|---|---|---|
| CN | 2508896 Y | 9/2002 |
| CN | 103003713 A | 3/2013 |

(Continued)

OTHER PUBLICATIONS

Extended European Search Report dated Aug. 11, 2014 as received in Application No. 14158401.1.

*Primary Examiner* — G. Bradley Bennett
(74) *Attorney, Agent, or Firm* — Maschoff Brennan

(57) ABSTRACT

The invention relates to an articulated arm coordinate measurement machine for a measurement of geometrical features of an object, comprising a stationed end of the articulated arm, opposed to a movable end of the articulated arm being manually movable by a human operator. A measurement probe head is attachable to the movable end. It also comprises a graphical display unit located at the movable end of the articulated arm, in particular in vicinity of the probe head, in such a way that information provided by the display unit is visible for the operator during measurement. The display unit is built to provide an artificial view, which is graphically representing at least part of the object, in particular with respect to a point of view from or nearby the movable end of the arm so that the artificial view is similar to the operator's natural view of the object.

20 Claims, 9 Drawing Sheets

(51) Int. Cl.
*G06T 19/00* (2011.01)
*G09G 5/373* (2006.01)
*G09G 5/377* (2006.01)
*G01B 21/04* (2006.01)

(56) References Cited

U.S. PATENT DOCUMENTS

| | | | |
|---|---|---|---|
| 6,131,299 | A | 10/2000 | Raab et al. |
| 6,366,831 | B1 | 4/2002 | Raab |
| 7,693,325 | B2 * | 4/2010 | Pulla ................ G01B 21/04 |
| | | | 33/503 |
| 8,276,286 | B2 | 10/2012 | Bailey |
| 8,638,446 | B2 | 1/2014 | Briggs |
| 9,651,370 | B2 * | 5/2017 | Abe .................... G01B 21/04 |
| 2010/0239121 | A1 | 9/2010 | Meier |
| 2011/0173827 | A1 | 7/2011 | Bailey et al. |
| 2011/0173829 | A1 * | 7/2011 | Pettersson ............ B25H 1/0021 |
| | | | 33/503 |
| 2012/0144685 | A1 | 6/2012 | Atwell et al. |
| 2013/0104407 | A1 * | 5/2013 | Lee .................. G01B 5/163 |
| | | | 33/199 R |
| 2013/0222816 | A1 | 8/2013 | Briggs et al. |
| 2015/0049186 | A1 * | 2/2015 | Pettersson ............ G01B 21/047 |
| | | | 348/135 |
| 2015/0052769 | A1 * | 2/2015 | Noda .................. G01B 21/047 |
| | | | 33/503 |
| 2015/0211847 | A1 * | 7/2015 | Abe .................... G01B 5/008 |
| | | | 33/503 |

FOREIGN PATENT DOCUMENTS

| | | |
|---|---|---|
| EP | 1 136 897 A2 | 9/2001 |
| WO | 03/069267 A1 | 8/2003 |
| WO | 2011/085283 A1 | 7/2011 |

* cited by examiner

ARTICULATED ARM COORDINATE MEASURING MACHINE

FIELD OF THE INVENTION

The present invention relates generally to an articulated arm coordinate measurement machine according to claim 1 and to a method of operating an articulated arm coordinate measurement machine according to claim 12.

BACKGROUND

The present invention relates to the field of art of Articulated Arm Coordinate Measurement Machines (further also referred to as AACMM or CMM) as those are for example disclosed in U.S. Pat. No. 5,402,582, U.S. Pat. No. 6,366,831, or WO 03/069267. Those devices comprise a base to be stationed and an arm comprising multiple arm segments connected by articulations. The articulations provide movability to a movable end of the arm, which is opposed to the base, and at the movable end there is a probe head, whereto a measurement probe can be attached. Each of the articulations of the arm is equipped with a sensor to determine a positional information of the articulation, so that the pose of the arm can be determined thereof and position and orientation of the probe head with respect to the base can be determined. The probe head is equipped with at least one, preferably exchangeable, probe head which can be used to measure a point or an area of the object to be examined. During the measurement, the probe head is manually guided by an operator to approach desired measurement points which's geometric coordinate data can be derived according to the pose of the arm.

For example, in U.S. Pat. No. 6,131,299 it is shown to equip such an articulated arm CMM with an alphanumeric display, LEDs and buttons, which are located nearby the handle of the movable end of a CMM. This display indicates the actual position of the arm as numerical X, Y and Z values representing three dimensional coordinates. The operator can thereby see the coordinate values while the workpiece is measured with the probe head.

In order to avoid the requirement of a high level host computer and application software beside the articulated arm, U.S. Pat. No. 5,978,748 shows a user interface and a controller with memory for storing an executable program and reference data, which are mounted to the movable end of an articulated arm. Thereby, the user can be provided with instructions (e.g. inspection procedures), stored CAD data can severe as reference data and a comparison of the actual measurements and the reference data can be done immediately.

U.S. Pat. No. 8,276,286 shows an AACMM with a fully integrated measurement controller and a display located at the base in such a way, that a collision with the measurement arm is precluded.

US 2012/0144685 shows an AACMM where the controller and display is located at the base. It provides a graphical user interface for performing a diagnostics or calibration procedure of the CMM.

A problem with those local computation systems integrated into the articulated arm is, that the lifecycle of such computation equipment is rather short, in particular much shorter than the lifespan of the articulated arm software. According to moors law, the hardware requirements with respect to CPU and memory requirement of the software increases dramatically during the usual lifespan of an AACMM, which is in general much longer than a usual computer software/hardware lifecycle, so that in general the computation unit has to be replaced before the measurement mechanics. Arm-internal intelligence can in general not be easily upgraded or replaced. In particular, those internal systems are specialized designs, which can not be replaced by a plurality of options. That special equipment is also known to be more expensive than off the shelf PC-Hardware. Also, with internal systems, the user is bound to the arms manufacturer for any upgrade or even software update, wherefore a solution with a standard PC and corresponding software that can be replaced and upgraded by products from many vendors and which can be bought at a common store or downloaded from the internet. The mere communication interfaces of computers (like USB, Ethernet, RS232, . . . ) are known to have a much longer lifespan and are often backward-compatible or upgradeable.

Another disadvantage of those prior art designs is that the measurement information provided on an external PC is not always directly visible for the operator during the measurement with the AACMM. In particular an unskilled operator regularly needs guidance on which measurement steps are to be preformed and how to approach all the desired measurement points, preferably in an efficient order, wherefore a standalone measurement protocol document is provided in prior art. In some prior art there might be some display showing the raw coordinate data determined by the machine, but this information is in general rather useless for an inexperienced operator.

SUMMARY

Some embodiments of invention may improve an AACMM, so that its usability for the operator is improved, in particular to make it more intuitive and to avoid falls measurements and/or damage to the AACMM. It is in particular an object to allow the operator to be fully concentrated on the probe head he guides during work, not having to look up from his work for conformations or guiding instructions.

Some embodiments of invention may provide user guidance to the operator, preferably a guidance with which the operator is always confronted during the measurement task and which can give online feedback of the measurement progress, critical results, warnings and the like.

Some embodiments of invention may simplify the identification of the desired measurement points and to ease the navigation to those measurement points at a complex object to be measured and/or to speed um the measurement by optimizing the path planning between the points to be approached.

Some embodiments of invention may ensure measurement quality and to avoid that the operator needs to have knowledge of the object to be measured or how to measure a certain feature and to ensure that each measurement is done the same way when multiple instances of an object have to be measured.

According to the present invention, the articulated arm comprises a display unit at the vicinity of the probe head, for example at the rotating grip on one of the last arm segments of the movable end of the arm, at the grip for movement of the arm or at the probe head itself—in particular if an optical scanning device is used as probe. Preferably the display unit is comprised in such a way, that the graphical information it provides is provided to the operator close to the position were the eyes are looking during the measurement, usually close to the probe tip at the movable end of the arm. Thereby an operator will always be able to see the display during the measurements—not as a prior art display fitted to the base which's view will often be obstructed by the workpiece to be measured, the articulated arm or the operator during measurement.

In one embodiment, the display unit can comprise a graphical screen for displaying graphical items based a pixel-raster. The attachment of the display unit to the arm can be moveable or flappable, to be adjustable to the operators most convenient view or to overcome obstructions in his view or obstructions of the movability of the probe caused by a collision of the display and the object to be measured or a collision with the arm it is attached to. The display unit can also be equipped with means to ensure that the information shown on the display unit always stays horizontal, for example by mechanical means using gravity to keep the display itself upright or by a electronic means rotating the graphical information shown by the display according to data from a gravity or level sensor.

The display unit can also be detachable, which can for example allow the operator to place the display unit on either one of the mentioned locations at the movable end of the arm, for example according to his convenience or according to the type of object to be measured. The display unit can also be fully integrated into the probe head, into an arm segment at the movable end or into the grip at the movable end of the arm.

In another embodiment, the display unit can comprise a projector for graphical information, which is built to project graphical information onto the object to be measured or in the vicinity of the actual measurement, for example onto the measurement table next to the actual measurement point.

In yet another embodiment, the display unit could be attachable to the operator itself, for example to the forearm of the operator, so that the view of the shown information is not influenced by the position of the wrist of the operator, or for example to the head of the operator like a head-up display, virtual reality glasses comprising micro screens or projection means to overlay graphical information to the operators view, for example a display unit like the known Google-Glasses.

The display unit can be supplied by wire via slip rings at the articulations or wireless by transformer transmission at the articulations or by batteries. Another option (also combinable with batteries) is to use energy harvesting from the operators movements of the arm to produce electricity to power the display unit during operation.

For a communication of the display device with the positional measurement unit of the arm and/or external computation devices, wired communication along the arm and/or wireless communication such as wireless networking like for example WiFi, Bluetooth, etc. can be used.

The display unit usually comprises some kind of computational unit, which can vary from a basic computation circuit to display an image to a powerful graphical processing unit (GUP) and/or a microcontroller, DSP, FPGA or ASIC. For the measurement with the articulate arm according to the invention, the major computational power can be done by a controller or industrial or personal computer which is located at or near the stationed base of the articulated arm or remote from the arm, which offers the advanced of easy substitutability and upgradeability and can help avoiding thermal problems. The display unit in this case only handles the basic computation for communication with the main computer and providing graphical outputs based thereon—it is so to say a remote user interface for an external computation device running the main application software. In another embodiment, the display unit also comprises severe computational power that allows handling real time computation required in the coordinate measurement machine, for example a System On Chip (SOC) similar to the ones used in smartphones, tablet computers or the like.

A camera comprised at the movable end of the arm, in particular at the display unit, can be used for overlaying a CAD of the workpiece with the actual image from the camera to guide the operator during a measuring procedure and/or to show deviations of geometrical features of the object compared to their desired values in real-time.

For example, a display unit mounted at the movable end of the arm with a camera mounted on the display and being orientated in the direction of the object can picture or film the object, in particular wherein the cameras field of view is covering the area in which the probe is capable of gathering measurements. The display can then present augmented reality content to the user, comprising at least part of the camera image overlaid by graphical information regarding the measurement task, For example, the measurement results can be shown in direct vicinity of the point or area that is measured by the probe head. Thereby, the operator no longer needs look at the stylus tip of the probe head directly, but can observe his measurements through the augmented reality image presented by the display unit. For example, also a desired next measurement point or the direction to approach it and/or a latest measurement result can immediately be presented to the operator. The augmented view also allows additional functions such a zooming in, to exactly approach the desired measurement point. The zooming can be controlled manually and/or a dynamic zooming, which can e.g. be dependent on the desired feature to be measured and/or the actual divergence from the probe head to the desired measurement point or area. In another embodiment for such an augmented view of measurement information, the display unit can also be transparent in its default state, so that the operator can look through the display at the object, and graphical information is superimposed on the view through the display, whereby a camera to the object can be omitted.

The display unit can also comprise a unit capable of tracking the eyes or head of the operator to identify his current view of the display unit and to adopt the presented information and/or camera image accordingly, so that the operator sees the object and the augmented information as he would naturally expect it without the display unit. The operator tracking option of this paragraph can also be turned on or of, dependent on its usability for the measurement task he is confronted with.

For interaction with the measurement machine, the display unit can comprise touch or contactless sensor means, such as a touch screen, gesture recognition, proximity sensors, etc., to detect interaction of the operator with the information provided by the display.

The information provided by the display unit can comprise a broad variety of graphical items, for example graphical and/or alphanumeric information to indicate measurement values, information to guide the operator through the measurement process, information about deviations from the expected measurement results state, indication of already measured points or areas or points or areas which are next in the measurement procedure, or the desired movement of the arm to approach the next point or area from the present location of the probe head in an efficient manner, show warnings, show hints, information regarding the current accuracy of measurement, etc.

In addition or alternatively, also an overlaying of CAD-data of the object as desired data combined with a real-life image of the object from a camera sitting in vicinity of the probe head can be provided by the display unit that is also located in vicinity of the probe head. The overlaid CAD data can be presented as a rendered 3D view, fitted to the reality view of the object, for example according to a known position of the object with respect to the arm (or respectively the arm's camera) or according to a measurement of some reference points at the object. The overlaid CAD data can also be presented in form a semitransparent textured view, a wire frame view, (with or without hidden edges or features), outer dimensions, dimensioning of the object and or the taken measurements as known from technical drawings, in particular with or without additional information regarding accuracy, tolerances, deviations, etc.

Beside such information which is directly related to the measurement, the display unit can also present a graphical user interface of the measurement machine, for example providing a selection of measurement programs or modes for special features, functions like repeat measurement, store measurement, or other functions known from measurement software at external personal computers interfaces. In the case of the execution of a stored part program for the measurement of the object, augmented reality can also display arrows to show to the user in which direction he needs to move the probe head to take the next point—when the next point is not in the field of view presented by the display unit, or a marker at the next point in the presented view—if it is in view.

At the probe head or in its vicinity, the display unit can also present steering illumination of the object, for example by using LEDs on the back of the display unit. In the case of the use of a line laser sensor or a RIM-Camera at the probe head, information on surfaces already scanned can be displayed as augmented reality. The operator can thereby be informed about missing areas or insufficient point density in certain areas, preferably in real time during the measurement.

In another embodiment of the present invention, the display unit can be embodied as a foldable display, also called flexible display, for example based on OLED- or E-Ink-technology, which can be rolled or even folded without breaking it. For example, the display can be rolled up and stored in a segment of the arm, preferably in one of the last segments of the arm in proximity to the probe head, or in the probe head. The user can then pull the display out of the arm, unrolling it, so it can be used during work and afterwards roll it back into its save enclosure when not being used. The unrolled or otherwise expanded display can then be and held and sustained in position by some support structure like a brace, a collapsible or foldable rod, etc. The support for the display can for example be also flexible or plastically deformable, e.g. like a gooseneck, etc. so the display can be adapted to the users demands of the present measurement task with a high degree of adaptability. The foldable display can for example also be wrapped around at least part of its previous enclosure and temporarily fixed thereto. Thereby the display is not exposed to damage when the arm is transported or when it is not used or not required for the present task.

Further embodiments of measurement options made possible by the present invention will also be presented in the description of the figures below.

In other words, the invention relates to an articulated arm coordinate measurement machine (AACMM) for a measurement of geometrical features of an object. The AACMM comprises a stationed end of the articulated arm opposed to a movable end of the articulated arm, wherein the movable end being manually movable by a human operator. A measurement probe head is attachable to the movable end, preferably a measurement probe head comprising exchangeable heads which allows replacement of worn out heads and/or an a usage of different probe heads adapted to the present measurement task to fulfil. The AACMM also comprises a graphical display unit to be viewed by the operator. The graphical display unit is located at the movable end of the articulated arm, in particular in vicinity of/to the probe head, in such a way that information provided by the display unit is visible for the operator during measurement. This means that the operator who is guiding the probe head by hand can observe the display unit during labour when he is looking towards the probe head he guides.

The display unit according to the invention is built to provide an artificial view, which is graphically representing at least part of the object during labour. The provided artificial view can in particular be shown with respect to a point of view from or nearby the movable end of the arm, for example, the artificial view can be similar to the operator's natural view of the object. In this artificial view, at least one desired point or region of the object to be measured is graphically marked on the artificial view by overlaying one or more indicative graphical elements.

Accordingly the invention also relates to a method of measuring geometrical features of an object by an articulated arm coordinate measurement machine (AACMM), having a movable end of the articulated arm to be manually moved by a human operator. The movable end comprises a measurement probe head and a display unit attached in vicinity of the probe head. The method comprising:
  computing an artificial view, graphically representing at least part of the object, wherein the computing of an artificial view can be done with a processing a camera-picture from a camera in vicinity of the probe head and/or a rendering of a digital model of the object, e.g. based on CAD-data of the object;
  adapting the artificial view dependent on the pose of the arm with respect to the object, wherein the pose can in particular be determined according to position sensors of the arm, in particular in such a way that the artificial view is seen with respect to a point of view from or nearby the movable end of the arm, preferably wherein the artificial view is similar to the operators natural view of the object;
  overlaying one or more indicative graphical elements to the artificial view for graphically indicating at least one desired point or region of the object to be measured, in particular wherein the overlaying of the elements is done at their corresponding location on the artificial view of the object;
  providing the artificial view and the indicative graphical elements in vicinity of the probe head to the operator by the display unit, in such a way that the artificial view is visible for the operator during measurement.

Therein the indicating by the overlaid indicative graphical elements can provide a user-guiding to the operator, in particular instructing the operator in locating the desired point or region on the object and approaching it by the probe head, and/or providing geometrical information with respect to a point, region or geometrical feature of the object which was previously approached by the probe head.

Also, a dynamic zooming of the artificial view presented by the display unit can be done, which is dependent upon a distance of the probe head to the desired point or region of the object. Therein, the artificial view has a reduced scale if the distance is further in comparison to an increased scale if the distance is closer. Therefore, the distance can be calculated based on coordinate data determined by the AACMM.

The aforementioned method or part of it can also be embodied as a computer program product comprising program code stored on a machine-readable medium.

Beside being provided on a local medium, it can also be a computer-data-signal embodied as an electromagnetic wave. The computer program product is built to generate an artificial view of an object to be measured and to provide it by a display unit in vicinity of a probe head of an AACMM. The artificial view is therein adapted to be similar to the objects view which the operator manually guiding the probe head of the AACMM and the artificial view is overlaid with indicative graphical elements for user guidance of the operator. Therein, the artificial view can comprise a computer rendered 3D view and/or a picture of the object taken by a camera in vicinity of the probe head. Preferably, the artificial view can be updated in real-time upon movement of the probe head.

The method, or at least those parts of it which involve computation, can also be embodied as a computer program product that is stored on a machine readable medium or embodied as electromagnetic wave (such as wired or wireless data signal). Consequently, the invention further relates to an AACMM system comprising a display unit in the vicinity of the probe head and a computation means built to run a computer program providing functionality according to the invention, with or without the computer program.

BRIEF DESCRIPTION OF THE DRAWINGS

Devices, methods and setups according to the invention are described or explained in more detail below, purely by way of example, with reference to working examples shown schematically in the drawing. Specifically.

DETAILED DESCRIPTION

The diagrams of the following figures should not be considered as being drawn to scale. Where appropriate, the same reference signs are used for the same features or for features with similar functionalities. Different indices to reference signs are used to differentiate between different embodiments of a feature which are exemplary shown.

Figure 1A:
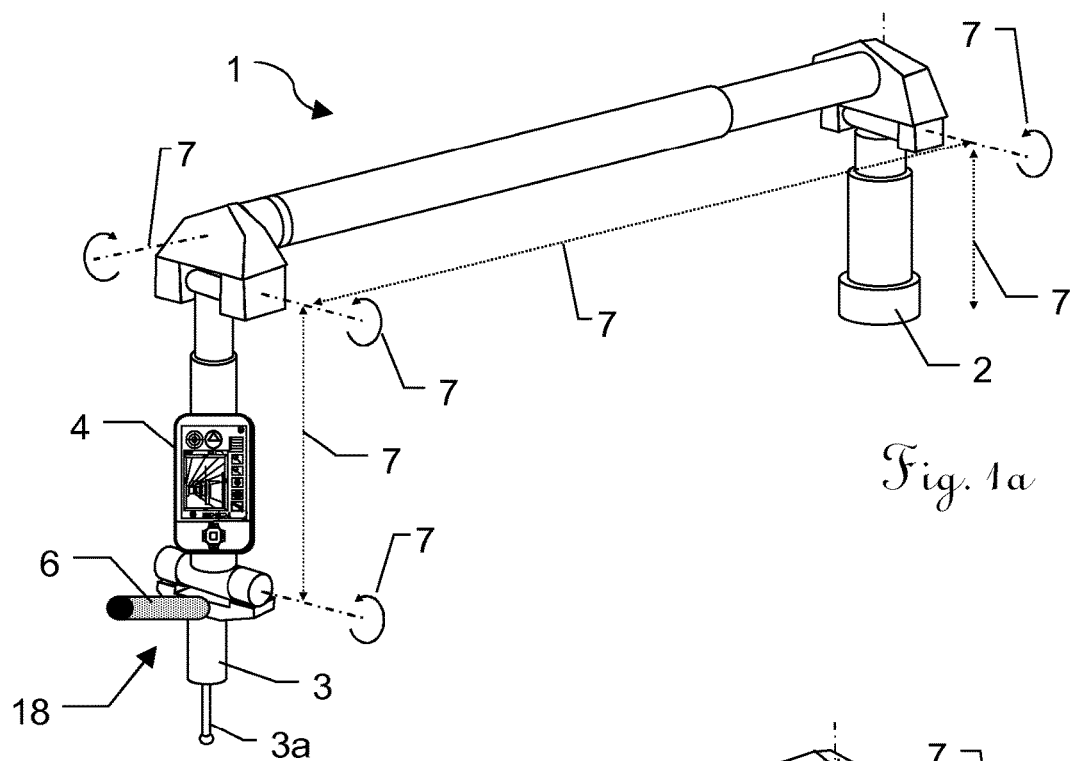
FIG. 1a shows an example of a first embodiment of an AACMM according to the invention with a touch trigger probe.

FIG. 1a illustrates an example of an embodiment of an Articulated Arm Coordinate Measurement Machine (AACMM) 1 according to the invention. It comprises a base 2, which is stationed during measurement. The whole AACMM 1 can either be embodied as being portable between the measurements or embodied to be permanently installed to a certain location, such as a measurement table, factory hall or the like.

The movable end 18 of the articulated arm, which is opposed to the stationed end 2 of the AACMM 1, is manually movable. Movability is provided by multiple articulations 7 along the arm, each providing at least one degree of freedom. The number and type of those articulations 7 may vary from embodiment to embodiment. The articulations 7 of the here shown example has five pivot joints and three linear guided pullouts. The movable end 18 is manually movable by a here not shown human operator, for example by means of some kind of handle, grip or another hand grip element 6. A probe head 3 is permanently or detachably attached to the movable end 18.

The probe head 3 is used for the measurement, for example by means of a touch trigger probe 3a shown in this drawing. For measuring, the operator approaches a desired measurement point by the touch trigger probe 3a and on touching the desired point at the surface of the object to be measured, the probe 3a initiates or triggers a capturing of positional information gathered by position sensors at the articulations 7 of the arm 1.

The movable end 18 of the arm also comprises a display unit 4 for providing an artificial view to the operator of the arm 1. This artificial view represents at least part of the object to be measured in a graphical manner, overlaid by at least one indicative graphical element. The indicative graphical element for example represents a desired point, line or region on the artificial view of the object, which indicates a location of the object to be measured and/or already measured. By those graphical indications, the operator can be informed about the progress of the measurement and/or the forthcoming measurement tasks and thereby be user-guided through the measurement process.

The operator can also be informed about the measurement results by the indicative graphical elements. For example, the display unit 4 can provide information about how to measure a desired geometrical feature of the object—for example as a step by step or point by point sequence of areas, points or lines to be measured by the probe head 3. After or even while the operator executes this sequence, the display unit 4 can provide information with respect to the measurement results, for example an indication of dimensional values, dimensioning lines, graphical and/or alpha-numerical indications shown at positions of the artificial view, which correspond to those on the real object. This makes it much easier for the operator to understand his measurements, in particular as the artificial view of the display unit 4 located at the movable end 18 of the arm is always in view of the operator during the measurement and he does not need to look up from the probe head 3 to check whether his sequence or measurement results are correct or to see what comes next. The operator can pay his full attention to the probe head 3 he guides with his hand.

In many cases the (desired) geometry of the object to be measured is previously known in form of e.g. CAD data or other construction plans. Often also the geometrical features to be measured by the AACMM are known in advance, e.g. according to a predefined quality management protocol. Therefore, the indicative graphical elements according to the invention can not only provide plain numerical coordinate data, but a direct comparison of desired values and actual measurement data. For example if a measured geometrical feature is within a defined tolerance band of the desired value, it can be marked by a simple checkmark, indicated in green, or the like. On the other hand, out of band measurements can be directly indicated on the artificial view, for example in red, blinking, etc. and dependent on the task, also a value of the deviation from the desired value can be presented. Thereby it can for example be avoided to confront an inexperienced operator with a bulk of (in his view maybe rather meaningless) numerical values and only the information which is essential at the present stage of measurement can be provided.

As the measurement sequence can be defined in advance, for example by a design engineer and/or a quality assurance division, the operator does not have to be highly skilled in measurements or the art of technical drawings or the like, but can simply follow the user guidance presented by the display unit 4 right before his nose, which can for example indicate step by step what to do and how the desired points have to be approached by the probe at the probe head, so that the desired geometrical feature will be measured. According to the invention the operator can not only be provided with a logical sequence in which one dimensional measurement follows another, but also with sequence optimized in view of the measurement time or the path to travel with the probe head. For example, the order of the points to be measured follows the shortest overall path to travel with the probe, which can be automatically identified by a navigation approach similar to map-navigation algorithms from vehicle navigation systems, so it does not matter if successive measurement points actually belong to different physical measurement results or not—like a measuring of all points at one end of the object followed by all points on the other end, regardless that the desired dimensions are actually multiple measurements from the one end to the other.

In a special embodiment, the user guidance system can also identify deviations of the approached measurement points from the desired measurement points according to the arms position measurement system and can decide online, whether the resulted measurement seems valid and plausible or if the measurement has to be repeated—both of which can also be indicated by the display unit 4. For example, the operator can be guided to first approach some special locations of the object with the probe head 3, according to which a geometrical referencing of the object with respect to the AACMMs 1 base 2 can be established, if the objects location is unknown at the start of the measurement.

Figure 1B:
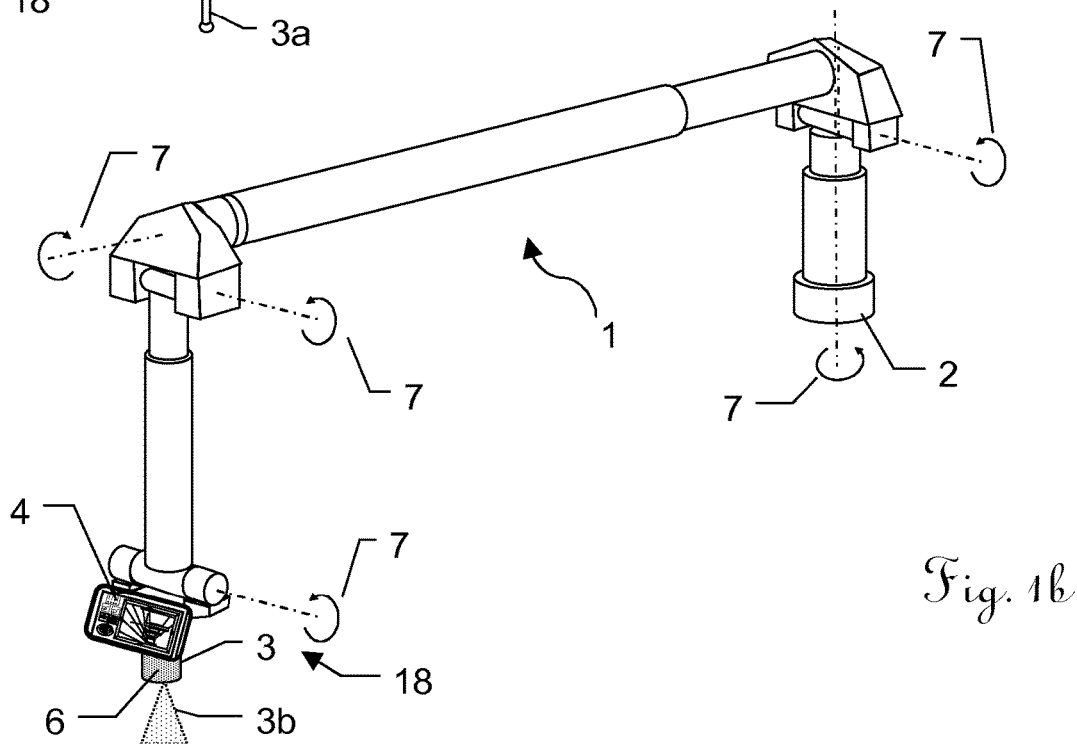
FIG. 1b shows an example of a second embodiment of an AACMM according to the invention with a non-contact probe.

FIG. 1*b* shows the setup which is similar to the one of FIG. 1, but the probe head 3 in this example comprises a contactless probe, for example an optical probe, a capacitive sensor, a laser scanning device, a RIM-camera, an Interferometer, or the like. As before, the display unit 4 is also located in the vicinity of the probe head 3, but this time it is attached to the probe head 3 itself, and not to one of the last segments of the movable end 18 of the AACMMs 1.

The probe head 3 is used for the measurement, for example by means of a measuring probe 3*b* shown in this drawing. For measuring, the operator approaches a desired measurement point or area by probe head 3, wherein the there is no physical contact of the probe and the object to be measured. The probe 3*b* is capable of quantizing the proximity of the object, which information is combined with the arms pose determined by the position sensors at the articulations 7 to result in a measurement value.

The display unit 4 is comprised in such a way, that it stays in view of the operator during measurement, which means that when the operator moves the probe head 3 in order to approach different measurement locations at the object, the display unit 4 follows those movements and thereby stays in view of the operator guiding the probe head 3 during the measurement process.

Figure 2:
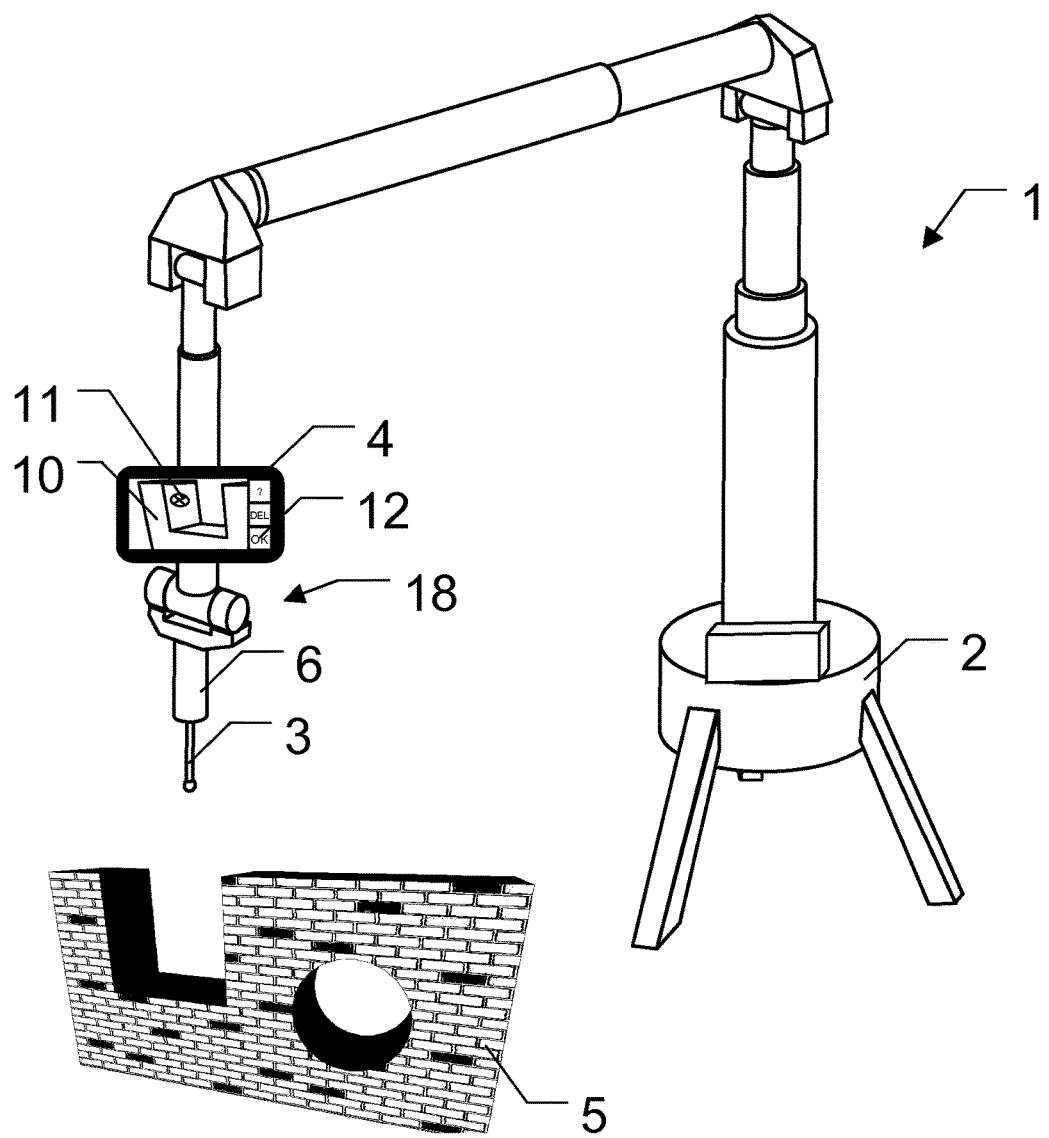
FIG. 2 shows an example of a third embodiment of an AACMM according to the invention.

FIG. 2 shows another AACMM 1 setup, mostly similar to the ones described before. The AACMM 1 compromises multiple arm segments joined by articulations, which are equipped with position encoders for determining a pose of the arm and based thereon position coordinates of a probe heads measurement range. This example also shows an object 5 to be measured, of which geometrical features have to be derived by means of the AACMM 1. Those geometrical features are derived by measurements with the probe head 3, dependent on the type of probe head, those can be determined by at least one point or surface surveyed by the probe head, wherefore different measurement techniques are known e.g. as some of them were outlined before.

Described again in other words, an embodiment of the invention can relate to a three-dimensional articulated arm coordinate measuring machine (AACMM) 1 system for measuring an object 5. It compromises a base 2 and a manually positionable articulated arm 1, having a first end 18, which is actuatable by an operator and is opposed to a second end that is rotationally coupled to the base 2. The articulated arm 1 comprises a plurality of arm segments which are connected by joints 7, with each joint corresponding to at least one degree of freedom, such that each arm segment is movable within a selected volume. Each joint 7 includes at least one position encoder for determining a position signal corresponding to an actual position of the joint 7. According to a combination of all of those positions, the actual pose of the arm can be determined and the position and orientation of the probe head 3 with respect to the base 2 is known. The position encoders at the articulations 7 can for example be embodied as optical encoder systems, either absolute or relative coded.

As mentioned, the AACMM 1 further comprises a probe head 3 for establishing and/or maintaining a contacting or contactless measurement connection to a surface of an object 5 to be measured. The probe head 3 can in particular be a touch probe 3*a* or a laser line probe (LLP) 3*b*. The probe head 3 can be attached either permanently or detachably to the first end 18. The AACMM 1 also comprises an electronic circuit which receives the position signals from the position encoders, such that three-dimensional position coordinates of the probe head 3 can be determined. The circuit comprises an electronic storage unit for storing data, a processor unit for receiving, processing and transmitting data. In the electronic storage unit, previously known data about the object 5 can be stored, for example comprising graphical data, nominal dimensional data and data about points and/or areas of the object to be measured, a CAD data file, as well as data about a predetermined or measured position and/or orientation of the object 5 relative to the AACMM.

A display device or unit 4 is mounted to the articulated arm 1 proximal to its first end 18. The display device 4 is capable of receiving data and providing visual information to an operator by one or more indicative graphical elements. The processor unit processes at least part of the previously known data such that at least one 2D- and/or 3D-model and/or picture representing at least part of the object 5 is generated, which can then be provided by means of the display unit 4. The at least one 2D- and/or 3D-model and/or picture generated thereby, preferably represents at least part of the object 5 with respect to a point of view from or nearby the first end 18 of the arm 1 toward the object 5 or the represented part of it. An operator actuating the first end 18 is thereby provided with an artificial view of at least part of the object 5 linked by similarity to the operator's actual or natural view of the object 5.

At least one measurement point and/or area of the object 5 to be taken is marked graphically in overlay to the artificial view by means of one or more artificial indicative graphical element. The graphical element can be a geometric shape such as dot and/or line, a cross hair, a coloured area, an arrow, a shade, a frame, a symbol and/or a symbolized representation of a working table, the AACMM 1, its probe head 3 or part of it. Thereby, the at least one 2D- and/or 3D-model and/or picture serves as visual user guidance information, which enables the operator actuating the first end to identify a measurement point and/or area of the object to be taken on the object 5, for example by contrasting the provided artificial view, comprising at least one 2D- and/or 3D-model and/or picture similar to the operators actual view of the object augmented with an indicative graphical element. This indication supports the operator in establishing a measurement connection with the probe head 3 to this desired measurement point and/or area of the object 5 to be taken. The indication can apparently also comprise dimensional information, in particular relative with respect to at least one measurement point, feature and/or area of the object previously taken by the operator during the current measurement task.

The information visually provided to the operator by the display unit 4 at the movable end 18 of the arm 1 can in particular compromise warning messages, information about the operational status of the AACMM 1 and/or information about the current measurement accuracy and/or deviations of the measurement results from nominal data. In an embodiment, the one or more artificial indicative graphical elements can also be animated, for example such that a direction is indicated, in which the first end 18 of the arm 1 is to be moved for surveying a desired measurement point and/or area.

The 2D- and/or 3D-models and/or pictures generated can be displayed by the display device as a, preferably real-time updated, sequence of pictures, for example as a digital movie. In addition to the indicative graphical elements, there can also be acoustic user guidance information, for example provided by a speaker unit comprised in the AACMM-System, preferably also near the movable end 18 of the arm 1, where the operator is.

For determining at least one measurement point and/or area of the object 5 and/or a measurement of a more complex geometrical feature of the object 5 (for example such as a radius, an angle, a polygonal shape, etc.) the processor can processes data previously known or provided by an external storage unit, based on an algorithm stored in the electronic storage unit. The AACMM-system can therefore also compromises a wireless or wired communication unit for transmitting data to and receiving data from an external data service such as a network-server or a cloud-service or can by itself provide server functionalities.

The display unit 4, which is here embodied as a graphical screen, provides a user-guidance to the operator in order to accomplish the desired measurement to determine the desired geometrical feature of the object 5. In particular, the here shown display device 4 can be a graphic display for graphical data representation with a graphics display resolution of at least 640×480 pixel, preferably of at least 800×600 pixel or more, and image colour depth of at least 8 bit, in particular 16 bit or more. Examples of the technology used for such a display screen can be a liquid crystal display (LCD), a thin film transistor (TFT) Display, an organic electroluminescent display such as an organic light emitting diode (OLED) display, a crystal light emitting diode (CLED) display, a plasma display such as a plasma addressed liquid crystal (PALC) display or a plasma display panel (PDP), or an electron emission display, such as a field emission display (FED), an E-Ink display or the like. As it will be explicitly shown further below, the display unit 4 can also be embodied as a foldable display device.

Figure 3A:
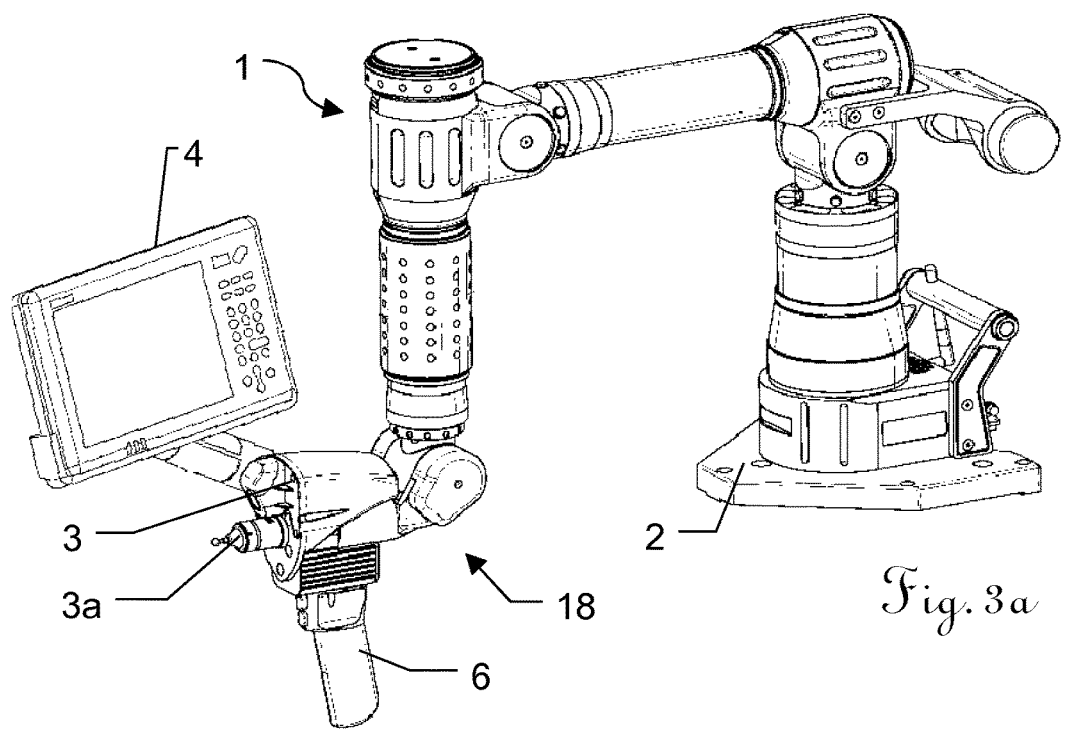
FIG. 3a shows an example of a fourth embodiment of an AACMM according to the invention with a display unit attached to the probe head.
Figure 3B:
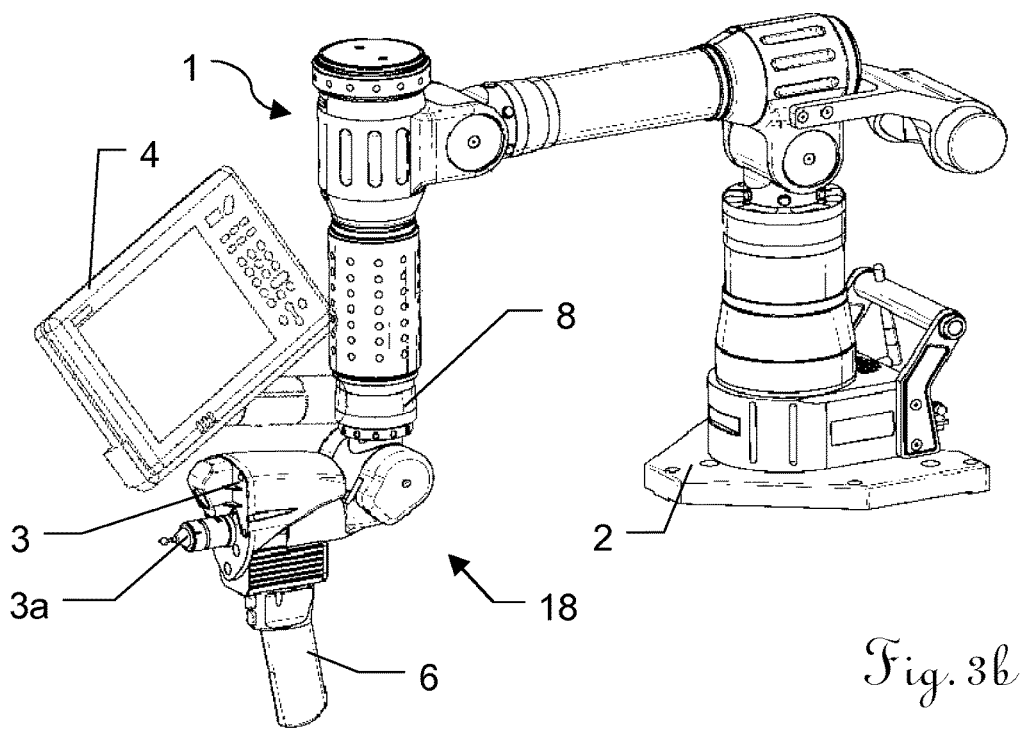
FIG. 3b shows an example of a fifth embodiment of an AACMM according to the invention with a display unit attached to an arm segment at the movable end.

FIG. 3a and FIG. 3b are showing some other embodiments of AACMMs 1, according to the invention.

The display unit 4 shown in those figures is embodied as a screen, which is equipped with additional control elements on the right of the displayed image, by which the operator can interact with the measurement software, which is used to determine the geometrical features of the object 4. Alternative the interaction can also be done by voice recognition, where acoustical commands from the operator are recognized by an according computation unit and an according command is executed by the measurement software, e.g. for controlling the measurement process like previously done by buttons or on a graphical software interface at a PC-screen.

In FIG. 3a, the display unit 4 is located at the probe head 3, whereas in FIG. 3b the display unit 4 is located at one of the last arm segments 8 before the probe heads end of the arm 1.

Figure 4A:
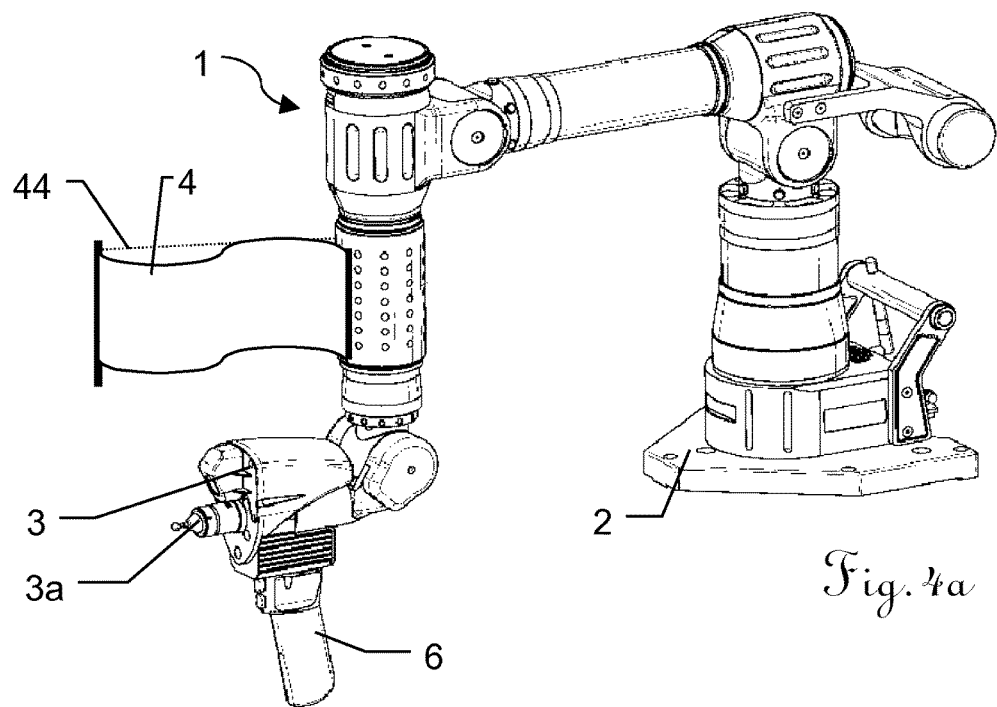
FIG. 4a shows an example of a sixth embodiment of an AACMM according to the invention with a display unit attached to an arm segment at the movable end.
Figure 4B:
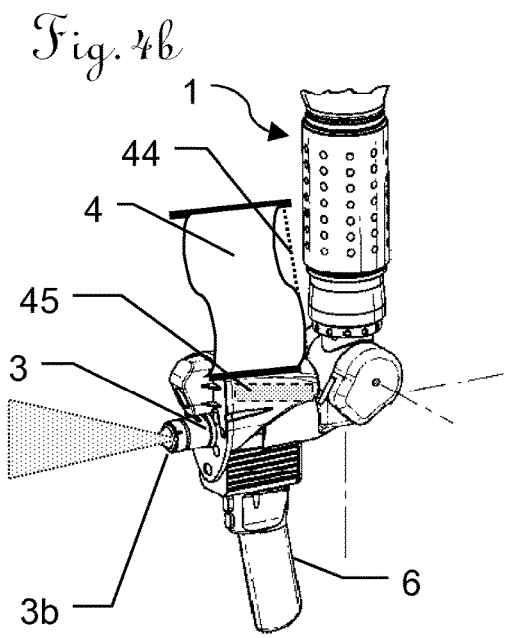
FIG. 4b shows an example of a seventh embodiment of an AACMM according to the invention with a display unit attached to an arm segment at the movable end.
Figure 4C:
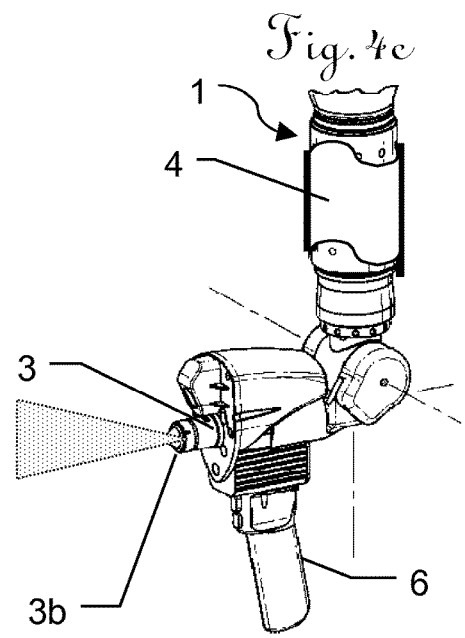
FIG. 4c shows an example of an eight embodiment of an AACMM according to the invention with a display unit attached to an arm segment at the movable end.

FIG. 4a, FIG. 4b and FIG. 4c are showing an embodiment according to the present invention, in which the display unit 4 is embodied by a flexible screen. In the sub-FIG. 4a, the foldable display unit 4 can be rolled up and stored within a segment at the movable end of the arm 1, when not in use—or pulled out and stabilized by some support 44 when in use.

In the sub-FIG. 4b, the foldable display unit 4 can be stored within the probe head 3 when not in use. In a special embodiment there is a transparent window 45, which allows to see at least a section of the foldable display 4, in its stored position. Thereby the stored display unit 4 can also provide some basic graphical indications to the operator through the window 45 in its stored position, but can be unfolded by the operator, if he desires to see more information. The computation means driving the display unit 4 can detect the extraction of the display unit 4 and adopt the displayed content accordingly.

In sub-FIG. 4b, the foldable display unit 4 can be stored within a section of the arm 1 in proximity to the probe head 3, and if extracted, it can be wrapped around at least part of the arms section where it was stored. In another embodiment, the flexibility of the display 4 can be used to initially adopt its shape to the shape of the AACMM portion it is attached to, but then being fixedly mounted in this shape and position. Optionally the display can be covered with a transparent protective cover to avoid damage.

Figure 5:
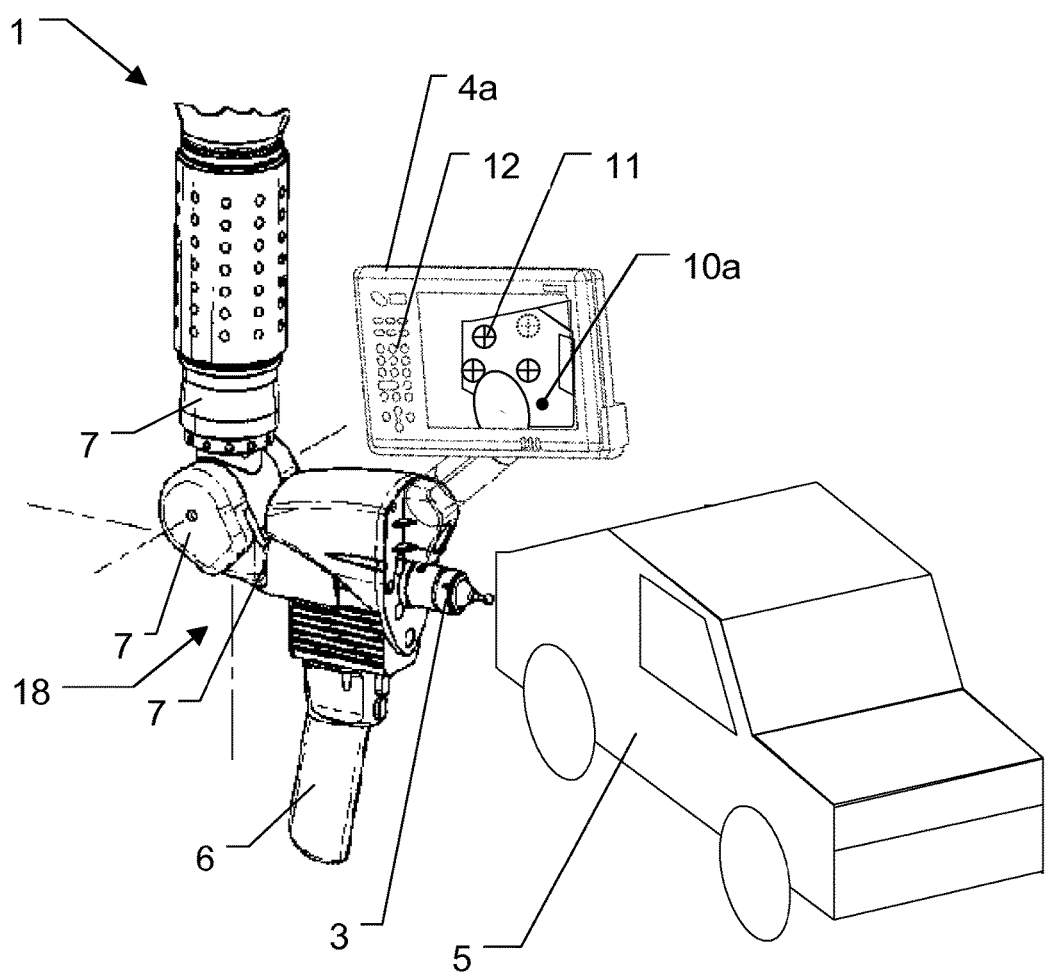
FIG. 5 shows a first working example of measurement with an AACMM according to the present invention.

In FIG. 5, only a portion of the AACMM 1 is shown, which is equipped with an embodiment of the display unit 4a. The object 5 to be measured in this example is shown as a vehicle. The display unit 4a comprises a screen section and an input section 12 for user interaction. In another embodiment, the input section can also be embodied by a touch screen or other known input means. The screen section of the display unit 4 shows a computer rendered artificial view 10 of the object 5. The computer rendered artificial view can be a wireframe view, a textured view, a virtual reality view, etc. which can be generated according to known data the object, for example like CAD-data, manufacturing data, a 3D model, a 3D pointcloud, a plurality of previously computer generated or taken 2D pictures, etc.

As it can be seen, the shown instance of the artificial view presented by the display unit 4a represents only part of the object 5. The presented artificial view 10 which is shown here, is generated in such a way to represent the part of the object 5 in a view, which is similar to the view the operator holding the handle 6 of the probe head 3 sees when looking at the object 5. For determining the point of view from which the presented artificial view 10 is generated, the computation means in charge of this can evaluate the actual pose of the arm. If the probe head 3 moves, the artificial view 10 can be regenerated accordingly. In a more advanced embodiment, also a tracking of the operators, in particular his eyes, his face, his head or some marker with respect to the display unit 4 can be determined in order to more accurately adopt the artificial view to the users view, but in general there is no requirement for a highly accurate adoption of the artificial view to the real view, as the operator will be able to abstract this view, if a basic similarity is given.

The presented artificial view 10 of the object 5 is overlaid by indicative graphical elements 11, which can for example provide information regarding the measurement process, user guidance or other information for the operator. In the shown example, there are indicative graphical elements shown to indicate desired measurement points to be approached by the probe head—shown in dashed lines, and already measured points—shown in solid lines. As an example for user guidance the next desired point can e.g. blink or an arrow indicating the required movement to get to the next point can be shown, if the next desired point is not within the field of the artificial view 10. The already measured points can be indicated by colours, if they are online compared with desired values, e.g. green if the dimensional data is ok—or red if the dimensional data is out of tolerance. The indicative graphical elements 11 according to the invention can also indicate more complex geometrical features of the object than single points. For example, such a graphical indication of complex geometrical features can be a diameter, a radius, a dimension line, an angle or other geometrical features.

The shown artificial view can for example also be dynamically zoomed, dependent on the probe heads distance to the object or the target area to be measured. Rough user guidance will be given by presenting a larger portion of the object in zoomed out artificial view, if the measurement target is far away. Such zooming of the artificial view can also be used instead of the above mentioned indication by an arrow, if the next desired point would otherwise not be within the field of the artificial view 10. This rough user guidance will be refined upon closing in the probe head to the target by presenting a smaller portion of the object in a zoomed in artificial view. Preferably the before described dynamic zooming will be done automatically by the computation means according to positional information of the probe head and the to be measured target, but there can also be a manual zoom function for the artificial view, which can be handled by the operator.

Figure 6:
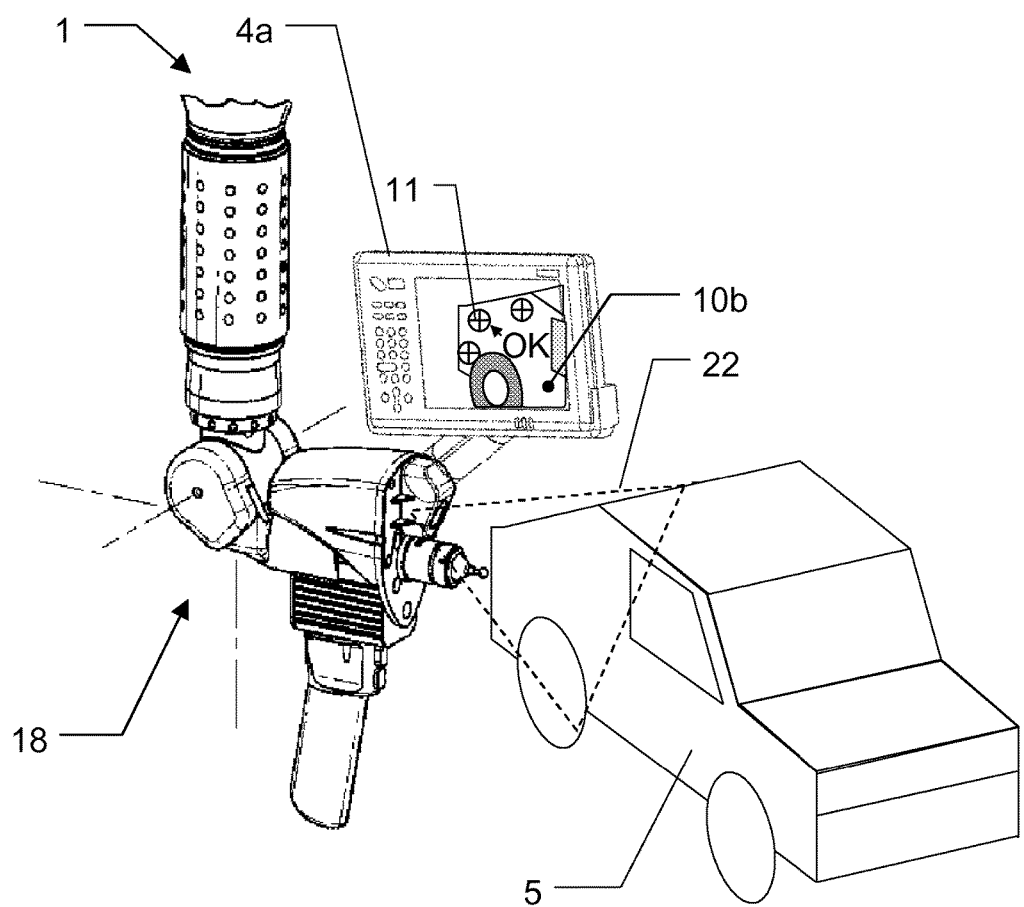
FIG. 6 shows a second working example of measurement with an AACMM according to the present invention.

FIG. 6 shows a similar view than the one of FIG. 4, but in this embodiment, the movable end of the arm is equipped with a camera, which's field of view is directed towards the object 5 to be measured, capturing a 2D (or 3D) image of at least the part of the target object, which is approached by the probe head 3. The field of view 22 of the camera is indicated in dashed lines. The camera can be located at the probe head, at the movable end of the arm or at (the back of) the display unit, wherein its field of view 10 preferably covers the measurement range of the probe head 3. The camera is built to capture image comprising data for the artificial view presented by the display unit 4 at the probe head. In the shown embodiment, the display unit 4 is embodied as a screen 4a, which presents the operator at least part of the picture captured by the camera as artificial view 10b, which artificial view is overlaid by indicative graphical elements 11, e.g. as described in the other embodiments.

In all the embodiments it can also be implemented that the artificial view 10 and or the overlaid elements 11 presented by the display device 4 are always presented substantially horizontal. As an example to achieve such, the display unit 4 can be built and or attached to always stay substantially upright, preferably by gravity, or the presented view and/or the overlaid elements can be digitally rotated by the computation means, e.g. according to gravity sensors or the measurement data of the pose of the arm.

The presented artificial view 10 can also be a combination of a camera picture and rendered graphical data computed according to a digital 2D- and/or 3D-model of the object, preferably wherein the view of the camera and/or the rendered data are adopted in such a way that their views are matching. Such a matching can be determined according to digital techniques of image processing (e.g. by edge extraction, . . . ) applied to the picture and/or according to the fact that the point of view of the camera can be determined according to the pose of the arm. For example, the display unit can present a part of the picture from the camera, augmented by the outlines of the object rendered from CAD data in an overlaid wireframe representation, which is further overlaid by the indicative graphical elements 11, e.g. comprising dimensioning lines from edge to edge and an indication of one or more points or areas to approach with the probe head 3 in order to measure this geometrical feature.

The camera or the movable end 18 of the arm 1 can also comprise an illumination for the cameras field of view.

In an embodiment, the camera can be arranged behind a screen of the display in such a way to capture a picture with a field of view that is similar to the one that the observer of the screen would see if the screen would not present. The picture is displayed on the screen in such a way that it effects to the observer to sees through the display, expect that this shown artificial view is overlaid by indicative graphical elements according to the invention. The information overlaid to the image is shown at a location in the picture which corresponds to the location of the object to which the information relates. As the whole system is a coordinate measurement machine, the displayed information can in particular represent geometrical features of the object, in particular desired or already taken measurement points, dimensions or areas at the object.

In a special embodiment, the display unit 4 comprises a transparent screen, which allows the user to look through it like a window, but which's view can be overlaid by the indicative graphical elements. Thereby, the usage of a camera can be avoided.

Figure 7:
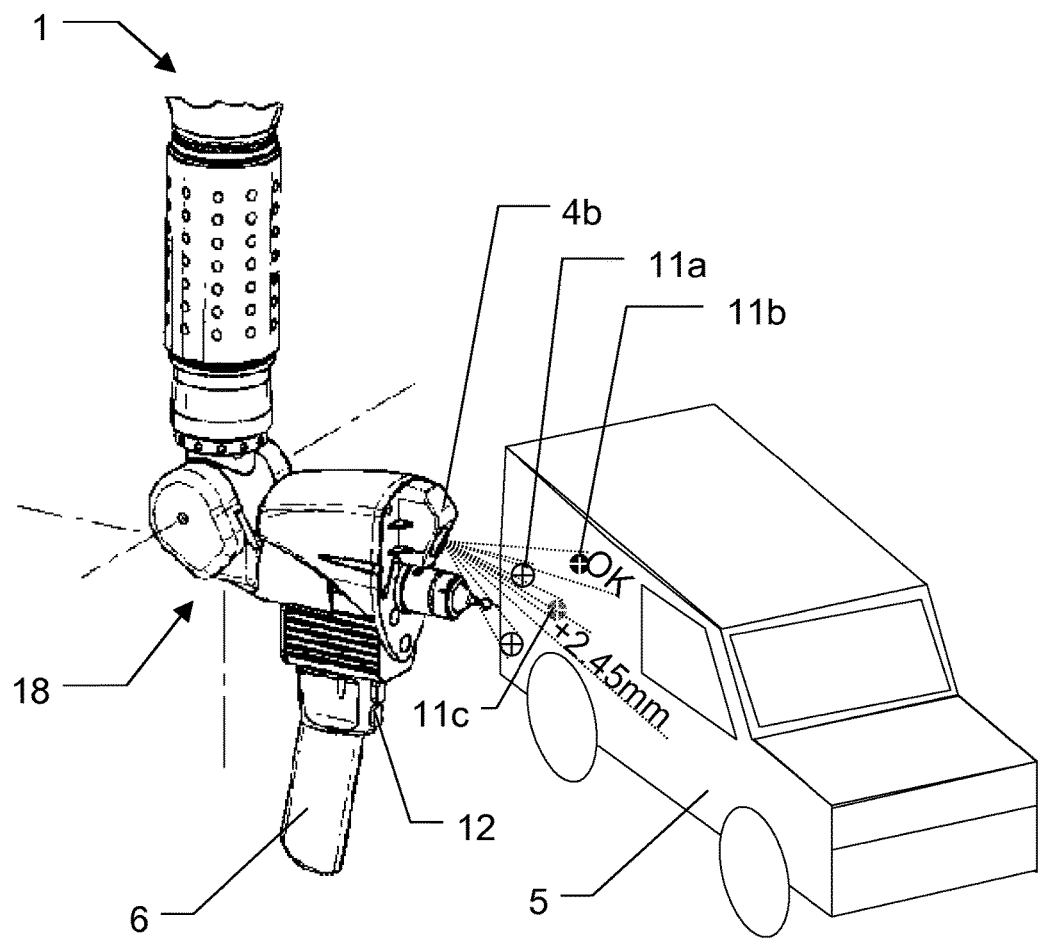
FIG. 7 shows a third working example of measurement with an AACMM according to the present invention.

FIG. 7 shows an exemplary embodiment according to the present invention, wherein the display unit 4 at the movable end 18 of the AACMM 1 is embodied as a projector directed into a range which comprises the measurement range of the probe head 3. A display unit 4 in this embodiment can for example be a projection means based on a fast defection of a visible laser beam to form the indicative elements at the target, as well as e.g. a LCD-, DLP-, or laser-projector, or other projection technology.

The display unit 4b in this embodiment directly projects the overlay of the indicative graphical elements 11a, 11b and 11c (e.g. for user guidance information user guidance information, measurement information, operational state of the AACMM, . . . ) onto the target object 5 itself or in the vicinity of it, e.g. close to the measured feature of the object onto a measurement table. The projected information can therein be adopted according to the posture of the AACMM in order to keep the projection stable and preferably upright during movement of the movable end 18 of the arm 1. The indicative graphical elements 11 shown here comprise an element 11a—representing a to be measured point or area,
an element 11b representing a already measured point which is within the tolerance of its desired geometrical values and an optional indicative text element,
an element 11c representing an already measured point which is outside of the tolerance of its desired geometrical values and an optional indicative text of the deviation from the desired value.

It can be advantageous to reduce the number of shown indicative graphical elements 11 to a necessary minimum which is required for user guidance, in order to not confuse the operator. The provided display view and the steps of the user guidance can for example be pre-prepared as a computer program or a configuration file.

Figure 8:
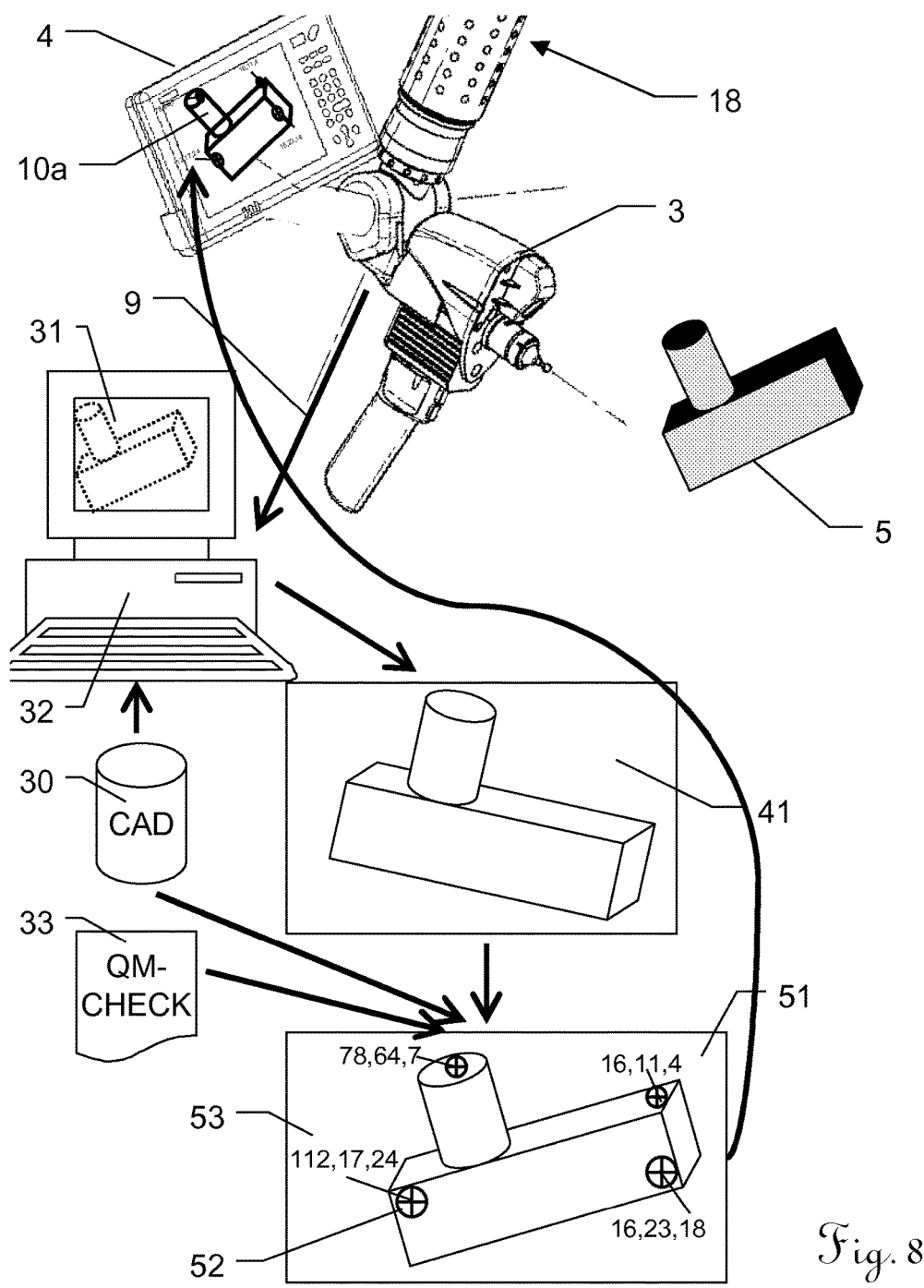
FIG. 8 shows a first measurement with an articulated arm coordinate measurement machine according to the invention.

FIG. 8 shows schematic view of another embodiment according to the invention, wherein the measurement of geometrical features according to the invention is explained, in particular with reference to an AACMM embodiment similar to the one of FIG. 4.

In the upper part of this figure, the movable end 18 of the AACMM is shown with the probe head 3 and an embodiment of the display unit 4. The object 5 to be measured is known in its desired geometrical data according to CAD-data 30 and the quality management division also provided an information 33 about those graphical features which have to be checked and how such is best done by means of the AACMM 1.

According to the CAD-data 30, the computation means 32 can render a graphical representation of the object 5 as artificial view 31 rendered from the CAD-data—as also shown in 41. According to the coordinate information 9 provided by the AACMM 1, the computation means 32 calculates the rendered artificial view 31 in such a way that is corresponds to a real view of the object as seen from a point of view in the vicinity of the probe head 3 or the display unit 4, preferably in real time. The computation means 32 is here shown as an AACMM-external computer, which is advantageous in view of upgradeability, as just the interfaces to the display unit 4 and to the AACMMs measurement system have to be compatible, but alternatively the computation means or parts of it can also be comprised within the AACMM-System or even within the display unit 4. It is also an option to use a distribute system wherein a computation means at the display unit 4 takes care of establishing the artificial view (e.g. updating of a camera picture and or visualisation of a pre-calculated 3D-model), which has a data-link to an external workstation computer preparing and pre calculating the therefore required information and providing it to the display unit 4.

If the location of the object with respect to the AACMM 1 is not known in advance, the operator can be prompted to measure some points of the object to (at least roughly for the purpose of generating a reasonable artificial view 31) reference it with respect to the AACMM 1 and its probe head 3, which can for example be done by presenting a rough isometric overview as artificial view where the referencing points are marked.

This artificial view 31 is then overlaid by information concerning the desired measurement task from the QM-sequence 33 and the geometrical information from the CAD-data 30. For the user guidance, it can be advantageous to overly the desired measurement task in a step by step manner, indicating one desired measurement point after the other. In the planning phase leading to the QM-sequence, it is also possible to optimize the efficiency of the measurement, e.g. by manually or automatically choose the order of the points to be measured in such a way that the overall route in-between the points to approach is minimized, e.g. by a known numerical optimisation algorithm. An example of the resulting overlaid artificial view as seen from a point of view similar to the one of the operator of the AACMM 1 is shown in 51. It comprises the rendered view of the object, or at least of the most relevant part of the object in order to identify the object, the desired portion of the object and to execute the measurement. Overlaid thereto, this example shows indicative graphical elements 52 for marking the measurement points to be approached and indicative graphical elements 51 comprising alphanumeric information about the object, its dimensioning, the measurement task to fulfil and/or the state of the AACMM 1. This overlaid artificial view 10a is then presented to the operator by the display means 4, which is located at the movable end 18 of the AACMM 1 in vicinity of the probe head 3, in such a way that it will be in view of the operator during the measurement.

Figure 9:
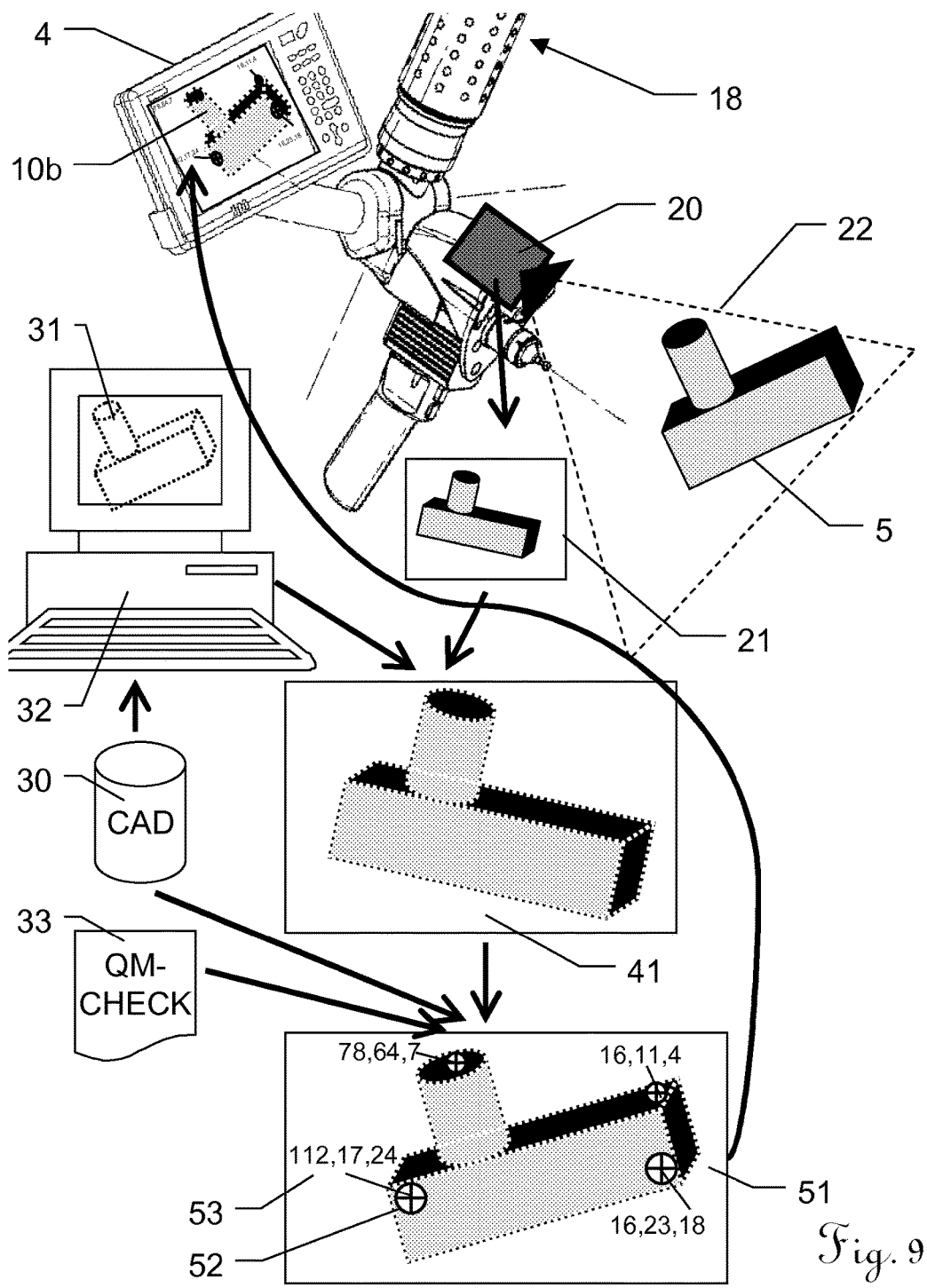
FIG. 9 shows a second example of a measurement with an articulated arm coordinate measurement machine according to the invention.

FIG. 9 shows schematic view of another embodiment according to the invention, wherein the procedure according to the present invention is explained, in particular with reference to the embodiment of FIG. 5.

In this embodiment, the movable end of the arm 18 comprises a camera 20 which has a field of view 22 which comprises at least part of the measurement range of the probe head 3 and at least part of the object 5 during measurement. The picture from the camera 20 is shown at 21, wherein the picture 21 is preferably a sequence of picture or a video.

This picture or a section thereof will be presented in artificial view by the display unit 4, but overlaid with indicative graphical elements, wherein the overlay is derived according to geometrical information of the object, e.g. based on the CAD-data 30, and according to desired measurement task data 33, e.g. based on the QM-data 33. In order to locate the overlaid elements at the correct locations, the view which is shown in the picture can be identified according to the known actual pose of the arm and/or according to digital image processing.

In the advanced embodiment shown here, there is also a computer rendered view of the object 31, which is matched with the picture and overlaid to it, in order to get the artificial view as shown in 41. In a simpler embodiment, only the picture can be shown without an overlaid CAD-data rendering.

The artificial view 41 is then further overplayed by indicative graphical elements 52,53 or other elements as discussed before and/or exemplary shown in 51 and 10*a*. The display unit located at the movable end of the arm then shows this view 10*b* to the operator and thereby provides a user guidance to execute the measurement task and to provide information directly at the tool the operator is working with.

A skilled person is aware of the fact that details, which are here shown and explained with respect to different embodiments, can also be combined in other permutations in the sense of the invention.

What is claimed is:

1. An articulated arm coordinate measurement machine for a measurement of geometrical features of an object, comprising:
    a stationed end of the articulated arm, opposed to a movable end of the articulated arm being manually movable by a human operator, to which movable end;
    a measurement probe head is attachable; and
    a graphical display unit;
    wherein the graphical display unit is located at the movable end of the articulated arm, in vicinity of the probe head, in such a way that information provided by the display unit is visible for the operator during measurement,
    wherein the display unit is built to provide an artificial view, graphically representing at least part of the object with respect to a point of view from or nearby the movable end of the arm, wherein the artificial view is similar to the operators natural view of the object, and
    wherein at least one desired point or region of the object to be measured is graphically marked on the artificial view by overlaying one or more indicative graphical elements.

2. The articulated arm coordinate measurement machine according to claim 1, wherein:
    the display unit graphically represents at least part of the object with respect to a point of view from or nearby the movable end of the arm.

3. The articulated arm coordinate measurement machine according to claim 1, wherein:
    it comprises a graphical processing unit which is built to generate the artificial view of the object as a computer-rendered view based on known information with respect to the object, based on known CAD data of the object, which artificial view is augmented by the overlaid indicative graphical elements; and
    which artificial view is based on the actual posture of the articulated arm coordinate measurement machine, wherein the rendered view substantially corresponds to the operators view of the object when moving the probe head, wherein the artificial view at least comprises a measurement range of the probe head.

4. The articulated arm coordinate measurement machine according to claim 1, wherein:
    it comprises a camera located in the vicinity of the movable end of the arm, which is built to provide a view of the object as a picture of at least part of the field of view of the camera with the field of view comprising a measurement range of the probe head preferably a live updated picture in form of a video, which picture is processed by a digital computation means and augmented by the overlaid indicative graphical elements.

5. The articulated arm coordinate measurement machine according to claim 1, wherein:
    the display unit provides the artificial view comprising an overlay of the picture from the camera and the rendered view from the graphical processing unit, in such a way that the rendered view geometrically matches with the picture, based on information of cameras point of view determined by the arms posture and a known location of the object with respect to the arm or at least one measurement of the object by the articulated arm coordinate measurement machine.

6. The articulated arm coordinate measurement machine according to claim 1, wherein:
    the graphical display unit comprises a graphical screen with a two dimensional array of pixels, located at the movable end, wherein the graphical screen is a foldable display which is preferably built to be stored within a segment of the arm or the probe head while not in use.

7. The articulated arm coordinate measurement machine according to claim 1, wherein:
    the graphical display unit comprises a projector means located at the movable end, built to provide the artificial view as an optical projection of the indicative graphical elements in overlay onto and/or next to the object.

8. The articulated arm coordinate measurement machine according to claim 1, wherein:
    the projection of the display unit is adopted according to an actual posture of the articulated arm coordinate measurement machine 1 and known information about the object, in such a way that the indicative graphical elements are projected at the desired locations onto the object, wherein distortions of the projected indicative graphical elements—according to a non-right-angled projection angle with respect to the projection target surface—are numerically compensated in the projected artificial view.

9. The articulated arm coordinate measurement machine according to claim 1, wherein:
    the indicative graphical elements are provided in such a way to be substantially vertically by taking into account an actual posture of the articulated arm coordinate measurement machine 1.

10. The articulated arm coordinate measurement machine according to claim 1, wherein:
    the indicative graphical elements are provided in such a way to be substantially vertically by taking into account an actual posture of the articulated arm coordinate measurement machine 1 according to position and orientation information of the movable end of the arm determined by position sensors at articulations of the arm which are also used for the articulated arm coordinate measurement machine measurement.

11. The articulated arm coordinate measurement machine according to claim 1, wherein:
    the indicative graphical elements comprise at least a graphical element for indicating at least one of:
    a geometrical features on the object, a line and/or an area,
    a desired direction to move the probe head,
    a desired target point or area to be approached with the probe head,
    an already measured point, line or area,
    absolute and/or relative coordinate values of at least one already measured and/or to be measured points, lines or areas,
    deviations from a desired value and/or its tolerance-band of at least one of already measured points, lines or areas, a dimensioning of geometrical features of the object, a measurement protocol of already measured geometrical features, a forthcoming desired geometrical feature to be measured and by approaching which desired points or regions of the object this desired geometrical feature is to be measured, and an area which can be interacted with by the operator to accomplish a desired functionality of the articulated arm coordinate measurement machine.

12. The articulated arm coordinate measurement machine according to claim 1, wherein:

it provides a graphical user interface with means for receiving input from the operator for at least partly operating the articulated arm coordinate measurement machine, wherein at least one of the areas where an indicative graphical element is provided is built to receive the input, wherein the means for receiving input is a touch sensitive device such as a touch screen and/or a keyboard, wherein the graphical user interface provides an interactive visual user-guidance to the operator comprising locations of the desired point or region on the object and graphical guidance how to approach the desired point or region by the probe head and/or provide visual information related to a point, region or geometrical feature of the object previously approached by the probe head.

13. The articulated arm coordinate measurement machine according to claim 1, wherein:

the display unit comprises means to transmit and receive data, wherein the display unit compromises a wireless communication unit for transceiving data, which provides a communication link to a computation means storing information of the objects geometry and/or the geometric feature to be measured by the articulated arm coordinate measurement machine.

14. A method of measuring geometrical features of an object by an articulated arm coordinate measurement machine, having a movable end of the articulated arm to be manually moved by a human operator, which movable end comprises a measurement probe head and a display unit attached in vicinity of the probe head, the method comprising:

computing an artificial view, graphically representing at least part of the object, wherein the computing of an artificial view is done with processing a camera-picture from a camera in vicinity of the probe head and/or rendering a digital model of the object, e.g. based on CAD-data of the object;

adapting the artificial view dependent on the pose of the arm with respect to the object, wherein the pose is determined according to position sensors of the arm, wherein the artificial view is similar to the operators natural view of the object;

overlaying one or more indicative graphical elements to the artificial view for graphically indicating at least one desired point or region of the object to be measured; and providing the artificial view and the indicative graphical elements in vicinity of the probe head to the operator by the display unit, in such a way that the artificial view is visible for the operator during measurement.

15. The method according to claim 14, wherein:

the pose is determined according to position sensors of the arm with respect to a point of view from or nearby the movable end of the arm.

16. The method according to claim 14, wherein:

overlaying one or more indicative graphical elements to the artificial view for graphically indicating at least one desired point or region of the object to be measured occurs at their corresponding location on the artificial view of the object.

17. The method according to claim 14, wherein:

the indicating by the overlaid indicative graphical elements is providing a user-guidance to the operator, instructing the operator in locating the desired point or region on the object and approaching it by the probe head, and/or providing geometrical information with respect to a point, region or geometrical feature of the object previously approached by the probe head.

18. The method according to claim 14, wherein:

a dynamic zooming of the artificial view presented by the display unit, which is dependent upon a distance of the probe head to the desired point or region of the object, wherein the artificial view has a reduced scale if the distance is further in comparison to an increased scale if the distance is closer, wherein the distance is calculated based on coordinate data determined by the articulated arm coordinate measurement machine.

19. One or more non-transitory computer-readable media storing one or more programs that are configured, when executed, to cause one or more processors to execute the method of claim 14.

20. One or more non-transitory computer-readable media storing one or more programs that are configured, when executed, to cause one or more processors to execute a method for generating an artificial view of an object to be measured an providing it by a display unit in vicinity of a probe head of an articulated arm coordinate measurement machine, which artificial view is adapted to be similar to the objects view which the operator manually guiding the probe head of the articulated arm coordinate measurement machine and which is overlaid with indicative graphical elements for user guidance of the operator, wherein the artificial view comprises a computer rendered 3D view and/or a picture of the object taken by a camera in vicinity of the probe head, wherein the artificial view is updated in real-time upon movement of the probe head, executed in a computation means of an articulated arm coordinate measurement machine according to execute the method of claim 14.

* * * * *